United States Patent
Choi et al.

(10) Patent No.: US 10,861,650 B2
(45) Date of Patent: Dec. 8, 2020

(54) MULTILAYER CERAMIC ELECTRONIC COMPONENT AND METHOD OF MANUFACTURING THE SAME

(71) Applicant: SAMSUNG ELECTRO-MECHANICS CO., LTD., Suwon-si (KR)

(72) Inventors: Hye Young Choi, Suwon-si (KR); Jae Hyun Lee, Suwon-si (KR); Hyun Hee Gu, Suwon-si (KR); Sun Woong Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 57 days.

(21) Appl. No.: 16/168,102

(22) Filed: Oct. 23, 2018

(65) Prior Publication Data

US 2019/0362894 A1 Nov. 28, 2019

(30) Foreign Application Priority Data

May 28, 2018 (KR) .......................... 10-2018-0060431

(51) Int. Cl.
*H01G 4/232* (2006.01)
*H01G 4/30* (2006.01)
(Continued)

(52) U.S. Cl.
CPC .......... *H01G 4/2325* (2013.01); *H01G 4/012* (2013.01); *H01G 4/30* (2013.01); *H01G 4/008* (2013.01); *H01G 4/1227* (2013.01); *H01G 4/248* (2013.01)

(58) Field of Classification Search
None
See application file for complete search history.

(56) References Cited

U.S. PATENT DOCUMENTS 7,808,770 B2 * 10/2010 Itamura ............... H01G 4/2325
361/303
10,361,035 B1 * 7/2019 Song .................... H01G 4/2325
(Continued)

FOREIGN PATENT DOCUMENTS

JP H11-307391 A 11/1999
JP 2006-128385 A 5/2006
(Continued)

OTHER PUBLICATIONS

Korean Office Action dated Oct. 18, 2019 issued in Korean Patent Application No. 10-2018-0060431 (with English translation).

*Primary Examiner* — Dion Ferguson
(74) *Attorney, Agent, or Firm* — Morgan, Lewis & Bockius LLP

(57) ABSTRACT

A multilayer ceramic electronic component includes: a ceramic body including a dielectric layer and a first internal electrode and a second internal electrode disposed in a stacking direction to face each other with the dielectric layer interposed therebetween; and a first external electrode electrically connected to the first internal electrode and a second external electrode electrically connected to the second internal electrode. Where a length of the first electrode layer in a length direction of the ceramic body is denoted by A and a length of the second electrode layer in a length direction of the ceramic body is denoted by B, B is shorter than A.

19 Claims, 2 Drawing Sheets

(51) Int. Cl.
*H01G 4/012* (2006.01)
*H01G 4/008* (2006.01)
*H01G 4/248* (2006.01)
*H01G 4/12* (2006.01)

(56) References Cited

U.S. PATENT DOCUMENTS

| | | | | |
|---|---|---|---|---|
| 2014/0022689 A1* | 1/2014 | Kwag | ................ | H01G 4/232 |
| | | | | 361/301.4 |
| 2014/0085767 A1* | 3/2014 | Kang | ................ | H01G 4/12 |
| | | | | 361/301.4 |
| 2014/0174800 A1* | 6/2014 | Chang | ................ | H05K 1/185 |
| | | | | 174/257 |
| 2014/0347783 A1* | 11/2014 | Kisumi | ................ | H01B 1/22 |
| | | | | 361/301.4 |
| 2017/0301469 A1* | 10/2017 | Juhng | ................ | H01G 4/232 |
| 2018/0082785 A1* | 3/2018 | Asano | ................ | H01G 4/005 |
| 2018/0151296 A1* | 5/2018 | Yamada | ............. | H01G 2/065 |

FOREIGN PATENT DOCUMENTS

| | | | |
|---|---|---|---|
| JP | 2014-123707 A | 7/2014 | |
| KR | 10-2014-0011695 A | 1/2014 | |
| KR | 10-2014-0081283 A | 7/2014 | |
| KR | 10-2017-0112680 A | 10/2017 | |

* cited by examiner

I - I'

MULTILAYER CERAMIC ELECTRONIC COMPONENT AND METHOD OF MANUFACTURING THE SAME

CROSS-REFERENCE TO RELATED APPLICATION(S)

This application claims the benefit of priority to Korean Patent Application No. 10-2018-0060431 filed on May 28, 2018 in the Korean Intellectual Property Office, the disclosure of which is incorporated herein by reference in its entirety.

TECHNICAL FIELD

The present disclosure relates to a multilayer ceramic electronic component and a method of manufacturing the same and, more particularly, to a multilayer ceramic electronic component having improved reliability and a method of manufacturing the same.

BACKGROUND

With the recent trend toward miniaturization of electronic products, there is an increasing demand for a multilayer ceramic electronic component having small size and high capacitance.

Along with the demand for a multilayer ceramic electronic component having small size and high capacitance, external electrodes of a multilayer ceramic electronic component have also been thinned.

An external paste contains a conductive metal such as copper (Cu) as a main material to ensure hermetic chip sealing properties and electrical connectivity to a chip. The external paste also contains a glass as an auxiliary material to provide adhesive strength between the external electrodes and the chip while filling voids during sintering shrinkage of the metal.

A glass of the external electrode paste serves to accelerate copper sintering and serves as an adhesive between a ceramic body and an external electrode. The glass fills a void, which is not filled with a copper metal, to achieve complete hermetic sealing.

In general, an external electrode paste includes two or three different types of glass. In view of the nature of a typical glass, a glass having excellent acid resistance or excellent capacitance contactability has poor copper wettability due to a high softening point thereof, while a glass having excellent copper wettability has poor acid resistance or poor capacitance contactability.

Conventionally, an external electrode is formed by applying, drying, and sintering an external electrode paste including a single type of glass or two or three different types of glass.

In the case of such applying and sintering performed once, a glass included in an external electrode paste may not satisfy all requirements, such as for adhesiveness of an internal electrode and an external electrode, sealing of the external electrode, wettability with copper (Cu), acid resistance, and the like.

In view of the foregoing, an external electrode paste may be prepared by including two or three types of glass capable of solving the above problems. However, in order for the respective types of glass to successfully achieve desired functions, the respective types of glass need to be located in desired positions in the external electrode, respectively.

However, the high-temperature characteristics of glass make it difficult to locate the glass in a desired position in external electrodes.

SUMMARY

An aspect of the present disclosure is to provide a multilayer ceramic electronic component having improved reliability and a method of manufacturing the same.

According to an aspect of the present disclosure, a multilayer ceramic electronic component includes a ceramic body including a dielectric layer and a first internal electrode and a second internal electrode disposed in a stacking direction to face each other with the dielectric layer interposed therebetween and a first external electrode electrically connected to the first internal electrode and a second external electrode electrically connected to the second internal electrode, in which the first and second external electrodes may be disposed on the ceramic body and facing each other in a length direction of the ceramic body. The first external electrode and the second external electrode include a first electrode layer including a first conductive metal and a second electrode layer disposed on the first electrode layer and including a second conductive metal. B is shorter than A, where a length of the first electrode layer in a length direction of the ceramic body is denoted by A and a length of the second electrode layer in a length direction of the ceramic body is denoted by B. A ratio of the length directions A and B may satisfy $0 < B/A \le 0.5$.

According to an aspect of the present disclosure, a method of manufacturing a multilayer ceramic electronic component includes preparing a ceramic green sheet including a dielectric layer, forming an internal electrode pattern on the ceramic green sheet using a conductive paste for internal electrode including a conductive metal powder and a ceramic powder, forming a ceramic body including a first internal electrode and a second internal electrode disposed to face each other therein by stacking a ceramic green sheet on which the internal electrode pattern is formed, forming a first electrode layer including a first conductive metal and a glass on top and bottom surfaces and an end of the ceramic body, and forming a second electrode layer including a second conductive metal on the first electrode layer. B is shorter than A, where a length of the first electrode layer in a length direction of the ceramic body is denoted by A and a length of the second electrode layer in a length direction of the ceramic body is denoted by B. A ratio of B to A may satisfy $0 < B/A \le 0.5$.

According to another aspect of the present disclosure, a multilayer ceramic electronic component includes a ceramic body including a dielectric layer and a first internal electrode and a second internal electrode disposed in a stacking direction to face each other with the dielectric layer interposed therebetween and a first external electrode electrically connected to the first internal electrode and a second external electrode electrically connected to the second internal electrode, in which the first and second external electrodes may be disposed on the ceramic body and facing each other in a length direction of the ceramic body. The first external electrode and the second external electrode include a first electrode layer including a first conductive metal and a second electrode layer disposed on the first electrode layer and including a second conductive metal. A content of glass included in the second electrode layer may be less than a content of glass included in the first electrode layer.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Hereinafter, embodiments in the present disclosure will be described in detail, with reference to the accompanying drawings, where those components are rendered using the same reference number that are the same or are in correspondence, regardless of the figure number, and redundant explanations are omitted.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

Terms used in the present specification are for explaining the embodiments rather than limiting the present disclosure. Unless explicitly described to the contrary, a singular form includes a plural form in the present specification. The word "comprise" and variations such as "comprises" or "comprising," will be understood to imply the inclusion of stated constituents, steps, operations and/or elements but not the exclusion of any other constituents, steps, operations and/or elements.

Figure 1:
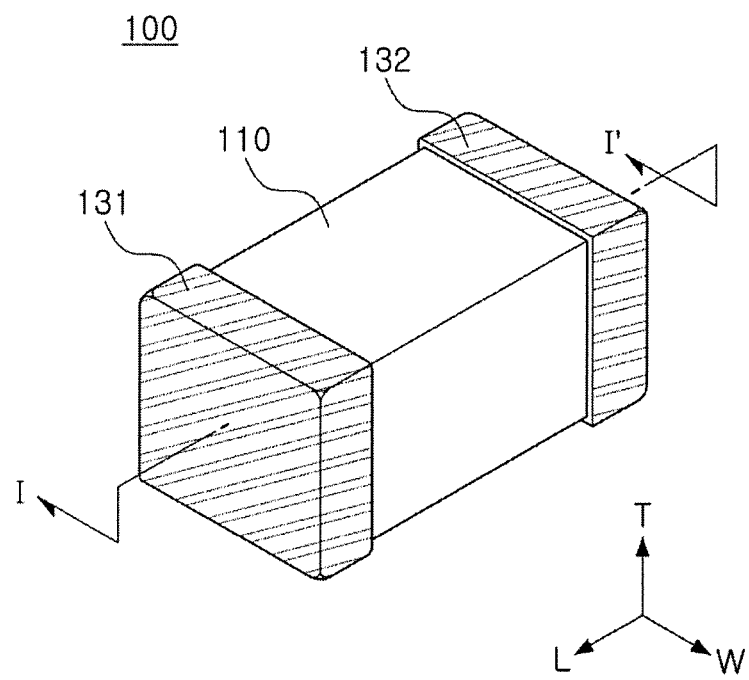
FIG. 1 is a perspective view of a multilayer ceramic electronic component according to an exemplary embodiment in the present disclosure.
Figure 2:
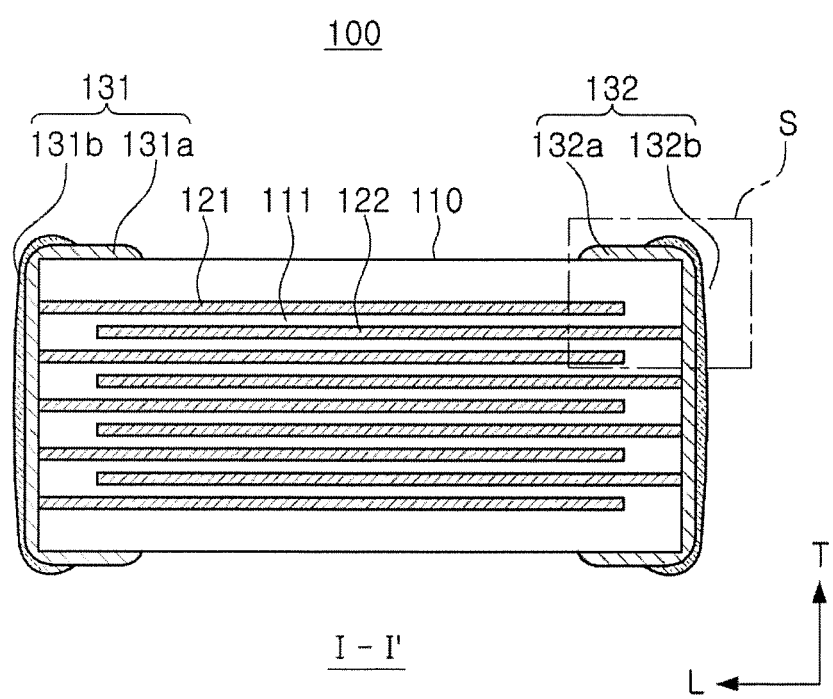
FIG. 2 is a cross-sectional view taken along line I-I' in FIG. 1.
Figure 3:
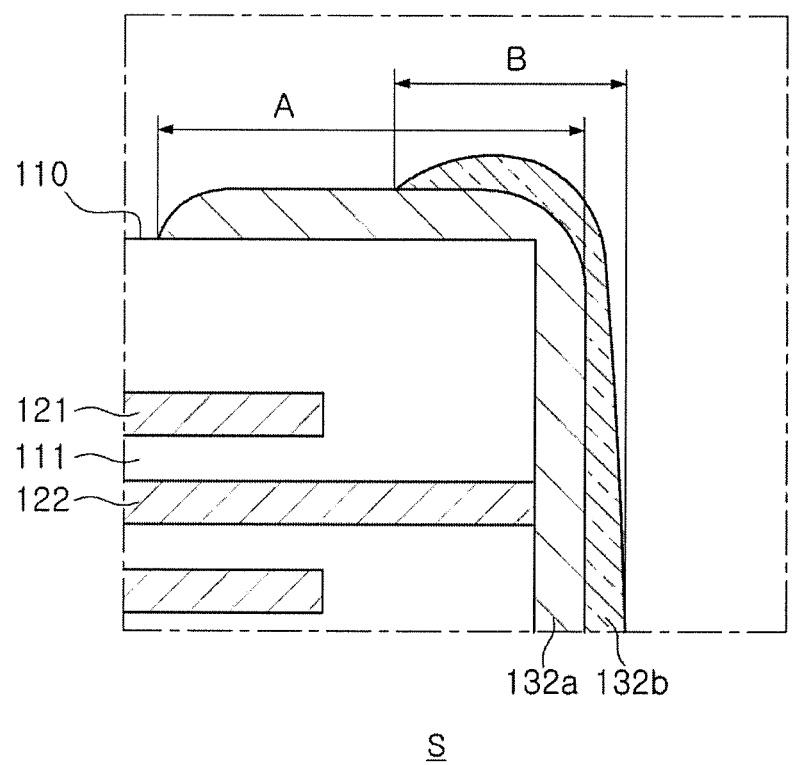
FIG. 3 is an enlarged view of a region 'S' in FIG. 2.

FIG. 1 is a perspective view of a multilayer ceramic electronic component according to an exemplary embodiment in the present disclosure, FIG. 2 is a cross-sectional view taken along line I-I' in FIG. 1 and FIG. 3 is an enlarged view of a region 'S' in FIG. 2.

Referring to FIGS. 1 to 3, a multilayer ceramic electronic component 100 according to an exemplary embodiment in the present disclosure includes a ceramic body 110 including a dielectric layer 111 and a first internal electrode 121 and a second internal electrode 122 disposed to face each other with the dielectric layer 111 interposed therebetween and a first external electrode 131 electrically connected to the first internal electrode 121 and a second external electrode 132 electrically connected to the second internal electrode 122. The first external electrode 131 and the second external electrode 132 include first electrode layers 131a and 132a including a first conductive metal and second electrode layers 131b and 132b, disposed on the first electrodes 131a and 132a and include a second conductive metal.

Hereinafter, a multilayer ceramic electronic component, in particular, a multilayer ceramic capacitor according to an exemplary embodiment in the present disclosure, will now be described, but exemplary embodiments in the present disclosure are not limited thereto.

In a multilayer ceramic capacitor according to an exemplary embodiment in the present disclosure, a 'length direction,' a 'width direction,' and a 'thickness direction' will be defined as an 'L' direction, a 'W' direction, and a 'T' direction in FIG. 1, respectively. The 'thickness direction' may be used to have the same concept as a direction in which dielectric layers are stacked, i.e., a 'stacking direction.'

In an exemplary embodiment in the present disclosure, the ceramic body 110 is not particularly restricted in terms of shape, but may have a hexahedral shape, as shown.

According to an exemplary embodiment in the present disclosure, a material for forming the dielectric layer 111 is not particularly restricted, as long as sufficient capacitance can be obtained thereby, and may be a barium titanate ($BaTiO_3$) powder.

A material for forming the dielectric layer 111 may be a powder such as a barium titanate ($BaTiO_3$) powder to which various ceramic additives, organic solvents, plasticizers, binders, dispersants, and the like may be added, according to objectives of the present disclosure.

A material for forming the first internal electrode 121 and the second internal electrode 122 is not particularly restricted, and they may be formed using a conductive paste including at least one of, for example, silver (Ag), lead (Pb), platinum (Pt), nickel (Ni), and copper (Cu).

A multilayer ceramic capacitor according to an exemplary embodiment in the present disclosure may include a first external electrode 131 electrically connected to the first internal electrode 121 and a second external electrode 132 electrically connected to the second internal electrode 122.

The first external electrode 131 and the second external electrode 132 may be electrically connected to the first internal electrode 121 and the second internal electrode 122 to form capacitance, and the second external electrode 132 may be connected to a potential different from a potential to which the first external electrode 131 is connected.

Hereinafter, structures of the first external electrode 131 and the second external electrode 132 will now be described in detail.

In general, nickel (Ni) is mainly used as a main material of an internal electrode and copper (Cu) is mainly used as a main material of an external electrode. When a glass is added to an external electrode paste, copper (Cu) contained in the external electrode may easily move to the internal electrode according to flowability of the glass.

When the copper (Cu) moving to the internal electrode meets nickel, an element constituting the internal electrode, a copper-nickel alloy may be formed through a sintering process.

The formation of the copper-nickel alloys may allow the external electrode and the internal electrode to be electrically connected to each other.

To implement the above characteristics, the first external electrode 131 and the second external electrode 132 include first electrode layers 131a and 132a including a first conductive metal and a glass.

The first electrode layers 131a and 132a may include a first conductive metal, selected from the group consisting of copper (Cu), nickel (Ni), silver (Ag), and silver-palladium (Ag—Pd), and a glass.

To form capacitance, the first external electrode 131 and the second external electrode 132 may be formed at opposite ends of the ceramic body 110, respectively. The first electrode layers 131a and 132a included in the first external electrode 131 and the second external electrode 132 may be electrically connected to the first internal electrode 121 and the second internal electrode 122.

The first and second electrodes 131a and 132a may be formed by applying the conductive paste prepared by adding the glass to the first conductive metal powder and sintering the applied conductive paste.

When copper wettability of the glass is excellent, the glass may be uniformly dispersed within the external electrodes. In this case, a plating layer may be easily formed.

The sentence "copper wettability of the glass is excellent" means that the glass is not aggregated or separated within the external electrode but is uniformly distributed over the entire external electrode to prevent the glass from flowing out to a surface of the external electrode.

When the copper wettability of the glass is poor, the glass is not uniformly mixed with copper, which is a main material of the external electrode, and glasses tend to aggregate. Thus, the glass flows out to the surface of the external electrode. As a result, it may be difficult to form a plating layer.

To improve the above characteristics, second electrodes 131b and 132b may be formed on the first electrode layers 131a and 132a to design a double-layer external electrode.

As an external electrode is decreasing in thickness with the trend toward miniaturization and high capacitance of products, after sintering an external electrode, a plating solution permeates into the external electrode during a plating process to degrade chip reliability.

Since a glass contained in an external electrode is not excellent in corrosion resistance against a plating solution, the plating solution permeates into the external electrode as the glass is corroded by the plating solution. By promoting the corrosion resistance of the glass contained in the external electrode against plating solution, the plating solution may be prevented from permeating into the external electrode during a plating process. Thus, chip reliability may be improved.

The glass is not particularly restricted as long as it is commonly used and may include, for example, a silicon-based oxide or a boron-based oxide.

A density of the glass is high, but copper wettability with the glass is poor. Since moisture permeability at the boundary between the copper and the glass is high, moisture resistance reliability is deteriorated.

Additionally, if acid resistance of the glass is low, planting discontinuity may occur at a corner portion of a body due to corrosion of the glass during the plating. The plating solution or moisture may permeate the corner portion to degrade moisture resistance reliability.

According to an exemplary embodiment in the present disclosure, second electrode layers 131b and 132b not containing or containing a small amount of glass may be disposed on the first electrode layers 131a and 132a to block a moisture permeation path formed by the permeation of the glass and improve hermetic sealing of the corner portion of the body. As a result, reliability degradation caused by permeation of the plating solution may be prevented.

More specifically, the first external electrode 131 and the second external electrode 132 include first electrode layers 131a and 132a including a first conductive metal and a glass and second electrode layers 131b and 132b including a second conductive metal. The first electrode layers 131a and 132a may be disposed on top and bottom surfaces in a thickness direction and an end of the ceramic body 110 in a length direction, and the second electrode layers 131b and 132b may be disposed on outer surfaces of the first electrode layers 131a and 132a corresponding to opposite end surfaces of the ceramic body 110 in the length direction, as well as the top and bottom surfaces in the thickness direction. Thus, the moisture permeation path formed by the permeation of the glass may be blocked and hermetic sealing of the corner portion of the ceramic body 110 may be improved. As a result, reliability degradation caused by the permeation of the plating solution may be prevented.

The second electrode layers 131b and 132b may include a second conductive metal.

The second conductive metal may be copper (Cu), but is not limited thereto.

The second electrode layers 131b and 132b may be formed by applying a prepared conductive paste including the second conductive metal powder and sintering the applied conductive paste or by means of sheet transfer or pad transfer, unlike dipping, as will be described later.

The second electrode 131b and 132b do not include a glass, but are not limited thereto.

The second electrode layers 131b and 132b may include a small amount of glass.

According to an exemplary embodiment in the present disclosure, a content of glass included in the second electrode layer 131b and 132b may be less than a content of glass included in the first electrode layer 131a and 132a.

According to an exemplary embodiment in the present disclosure, the second electrode layers 131b and 132b may not include a glass and include only the second conductive metal. The second electrode layers 131b and 132b are disposed on top surfaces of the first electrodes 131a and 132a corresponding to opposite longitudinal cross sections of the ceramic body 110. Thus, a moisture permeation path formed by the permeation of the glass may be blocked and heiutetic sealing of the corner portion of the ceramic body 110 may be improved. As a result, a degradation of reliability caused by the permeation of the plating solution may be prevented.

The second electrode layers 131b and 132b may further include silver (Ag).

The second electrode layers 131b and 132b may further include silver (Ag) as a second conductive metal, in addition to copper (Cu). Thus, a sintering temperature of the external electrode paste may be reduced to alleviate stress caused by diffusion of copper (Cu). As a result, reliability of a multilayer ceramic electronic component may be improved.

Referring to FIGS. 2 and 3, B is shorter than A, where a length of the first electrode layers 131a and 132a in a length direction of the ceramic body 110 is denoted by A and a length of the second electrode layers 131b and 132b in a length direction of the ceramic body 110 is denoted by B.

According to an exemplary embodiment in the present disclosure, a ratio of B to A may satisfy $0 < B/A \leq 0.5$.

As shown in FIG. 2, the length A of the first electrode layers 131a and 132a in a length direction of the ceramic body 110 and the length B of the second electrode layers 131b and 132b in a length direction of the ceramic body 110 may be measured by scanning an image of a longitudinal cross section of the ceramic body 110 using a scanning electron microscope (SEM).

As shown in FIG. 2, for example, the longitudinal lengths A and B may be obtained by measuring lengths of the first electrode layers 131a and 132a and the second electrode layers 131b and 132b in an image taken by scanning a length-thickness (L-T) cross section taken in a center of the ceramic body 110 in the width (W) direction using a SEM.

A ratio of B to A may adjusted to satisfy a condition of $0 < B/A \leq 0.5$ (A and B being lengthwise lengths) to implement a multilayer ceramic capacitor having improved reliability.

When the ratio of the longitudinal lengths A and B (B/A) is greater than 0.5, sizes of the second electrode layers 131b and 132b increase in both length and thickness directions. Thus, product miniaturization cannot be implemented. In addition, separation of the first and second external electrodes 131 and 132 from the ceramic body 110 may occur due to poor adhesion between a glass-less paste and a ceramic material.

A method for manufacturing a multilayer ceramic electronic component according to another exemplary embodiment in the present disclosure includes: preparing a ceramic green sheet including a dielectric layer; forming an internal electrode pattern on the ceramic green sheet using a conductive paste for an internal electrode including a conductive metal powder and a ceramic powder; forming a ceramic body 110 including a first internal electrode 121 and a second internal electrode 122 disposed to face each other therein by stacking a ceramic green sheet on which the internal electrode pattern is formed; forming a first electrode layer 131a and 132a including a first conductive metal and a glass on top and bottom surfaces and an end of the ceramic body 110; and forming a second electrode layer 131b and 132b including a second conductive metal on the first electrode layer 131a and 132a. Where a length of the first electrode layer in a length direction of the ceramic body 110 is denoted by A and a length of the second electrode layer in a length direction of the ceramic body 110 is denoted by B, a ratio of the length directions A and B satisfies 0<B/A≤0.5.

Hereinafter, a method for manufacturing a multilayer ceramic electronic component according to an exemplary embodiment in the present disclosure will be described, but is not described thereto.

The multilayer ceramic capacitor according to an exemplary embodiment in the present disclosure is manufactured through the following operations. First, a slurry formed to include barium titanate ($BaTiO_3$) is applied to a carrier film and dried to prepare a plurality of ceramic green sheets. Thus, a dielectric layer may be formed.

The ceramic green sheet may be prepared by mixing a ceramic powder, a binder, and a solvent to prepare a slurry, and the slurry may be formed into a sheet having a thickness of several micrometers (μm) using a doctor blade technique.

A conductive paste for an internal electrode including nickel particles having an average particle diameter of 0.05 to 0.2 μm and 40 to 60 parts by weight of may be prepared.

After the conductive paste for internal electrode is applied to the green sheet by means of screen printing, 400 to 500 internal electrodes are stacked to form a ceramic body 110.

A first electrode layer including a first conductive metal and a glass may be formed on top and bottom surfaces and an end of the ceramic body 110.

The first conductive metal is not particularly limited but may be at least one selected from the group consisting of copper (Cu), silver (Ag), nickel (Ni), and alloys thereof.

The glass is not particularly limited and may be material having the same composition as a glass used to form an external electrode of a typical multilayer ceramic capacitor.

The first electrode layer may be formed on the top and bottom surface and the end of the ceramic body to be electrically connected to the first internal electrode and the second internal electrode.

The first electrode layer may include 5 volume percent or more of glass relative to the first conductive metal.

A second electrode layer including a second conductive metal may be formed on the first electrode.

The second electrode layer may include a small amount of glass, but may not include a glass and may be formed of a second conductive metal.

More specifically, the second electrode layer may include 3 volume percent or less of glass relative to the second conductive metal, but may not include a glass and may be formed of a second conductive metal.

The second conductive metal is not particularly limited but may be, for example, copper (Cu).

In the method for manufacturing a multilayer ceramic electronic component according to another exemplary embodiment in the present disclosure, when a length of the first electrode layers 131a and 132a in a length direction of the ceramic body 110 is denoted by A and a length of the second electrode layers 131b and 132b in a length direction of the ceramic body 110 is denoted by B, a ratio of the length directions A and B satisfies 0<B/A≤0.5.

A ratio of the length directions A and B is adjusted to satisfy a condition of 0<B/A≤0.5 to implement a multilayer ceramic capacitor having improved reliability.

According to an exemplary embodiment in the present disclosure, the second conductive layers 131b and 132b may be formed on the first electrode layers 131a and 132a by means of dipping or by transferring a sheet including a second conductive pad or by means of pad transfer.

The dipping is the same as conventional dipping and may be performed in such a manner that the second electrode layers 131b and 132b are dipped to be disposed on top surfaces of the first electrode layers 131a and 132a corresponding to both lengthwise end surfaces of the ceramic body 110.

In the operation of transferring the sheet including a second conductive metal, a sheet including a second conductive metal attached on a PFET film is prepared. One longitudinal cross section of the ceramic body 110, in which the first electrode layers 131a and 132a are disposed on both lengthwise end surfaces, is closely adhered to the sheet by applying a pressure to the sheet. Thus, the sheet is transferred to form the second electrode layers 131b and 132b.

To remove an unnecessary portion of the ceramic body 110, the ceramic body 110 with the attached sheet is pressurized against a PET film. Thus, a portion which is not attached to a body of the sheet is removed by elasticity.

At this point, the sheet is cut at a corner portion of the ceramic body 110 by the PET film. When a pressure is removed, a sheet including a second conductive metal is attached only to a head surface of the ceramic body 110.

In this case, a sheet portion which is not attached to the ceramic body 110 remains on the PET film. Thus, a separate unnecessary sheet removal process may be omitted.

According to the above-described method, the second electrode layers 131b and 132b may be disposed on top surfaces of the first electrode layers 131a and 132b corresponding to both lengthwise end surfaces of the ceramic body 110.

For this reason, since an external electrode may be decreased in thickness, a high-capacitance multilayer ceramic capacitor may be implemented.

The second electrode layers 131b and 132b may be disposed on top surfaces of the first electrode layers 131a and 132a corresponding to both lengthwise end surfaces of the ceramic body 110.

Of the external electrodes 131 and 132, the second electrode layers 131b and 132b may be disposed on the top surfaces of the first electrode layers 131a and 132a corresponding to the both lengthwise end surfaces of the ceramic body 110 to cover the corner portions of the ceramic body 110.

Thus, hermetic sealing of the ceramic body 110 may be improved to prevent reliability degradation caused by permeation of a plating solution.

The other same features as the above-described multilayer ceramic electronic component according to an exemplary embodiment in the present disclosure will not be described herein.

As described so far, according to an exemplary embodiment in the present disclosure, first and second external electrodes include a first electrode layer including a first conductive metal and a glass and a second electrode layer including a second conductive metal. The first electrode layer is disposed on top and bottom surfaces and an end of the ceramic body, and the second electrode layer is disposed on a top surface of the first electrode layer corresponding to each of both lengthwise end surfaces of the ceramic body. Thus, a moisture permeation path formed by glass corrosion may be blocked and hermetic sealing of a corner portion of the ceramic body may be promoted. As a result, reliability degradation caused by permeation of a plating solution may be prevented.

While exemplary embodiments have been shown and described above, it will be apparent to those skilled in the art that modifications and variations could be made without departing from the scope of the present invention as defined by the appended claims.

What is claimed is:

1. A multilayer ceramic electronic component comprising:
   a ceramic body including a dielectric layer and a first internal electrode and a second internal electrode disposed in a stacking direction to face each other with the dielectric layer interposed therebetween; and
   a first external electrode electrically connected to the first internal electrode and a second external electrode electrically connected to the second internal electrode, the first and second external electrodes being disposed on the ceramic body and facing each other in a length direction of the ceramic body,
   wherein:
   the first external electrode and the second external electrode each include a first electrode layer including a first conductive metal and glass, and a second electrode layer disposed on the first electrode layer and including a second conductive metal, and B is shorter than A, where a length of the first electrode layer in the length direction of the ceramic body is denoted by A and a length of the second electrode layer in the length direction of the ceramic body is denoted by B, and
   a ratio of B to A satisfies $0<B/A\leq0.5$.

2. The multilayer ceramic electronic component of claim 1, wherein the second electrode layer does not include a glass.

3. The multilayer ceramic electronic component as set forth in claim 1, wherein:
   the first conductive metal is at least one selected from the group consisting of copper (Cu), silver (Au), nickel (Ni), and alloys thereof.

4. The multilayer ceramic electronic component as set forth in claim 1, wherein:
   the second conductive metal is copper (Cu).

5. The multilayer ceramic electronic component as set forth in claim 4, wherein:
   the second electrode layer further comprises silver (Au).

6. The multilayer ceramic electronic component as set forth in claim 1, wherein:
   the first electrode layer is disposed on top and bottom surfaces and an end of the ceramic body, and the second electrode layer is disposed on an outer surface of the first electrode layer corresponding to each of both lengthwise end surfaces of the ceramic body.

7. The multilayer ceramic electronic component as set forth in claim 1, wherein:
   the second electrode layer comprises less than 3 volume percent of glass, relative to the second conductive metal.

8. The multilayer ceramic electronic component of claim 1, wherein
   a content of glass included in the second electrode layer is less than a content of glass included in the first electrode layer.

9. The multilayer ceramic electronic component as set forth in claim 8, wherein:
   the first electrode layer comprises 5 or more volume percent of glass, relative to the first conductive metal, and
   the second electrode layer comprises less than 3 volume percent of glass, relative to the second conductive metal.

10. A method of manufacturing a multilayer ceramic electronic component, the method comprising:
    preparing a ceramic green sheet including a dielectric layer;
    forming an internal electrode pattern on the ceramic green sheet, using a conductive paste for an internal electrode, including a conductive metal powder and a ceramic powder;
    forming a ceramic body including a first internal electrode and a second internal electrode disposed to face each other therein by stacking the ceramic green sheet on which the internal electrode pattern is formed;
    forming a first electrode layer, including a first conductive metal and glass, on top and bottom surfaces and an end of the ceramic body; and
    forming a second electrode layer, including a second conductive metal, on the first electrode layer,
    wherein:
    B is shorter than A, where a length of the first electrode layer in a length direction of the ceramic body is denoted by A and a length of the second electrode layer in the length direction of the ceramic body is denoted by B, and
    a ratio of B to A satisfies $0<B/A\leq0.5$.

11. The method of claim 10, wherein the first electrode layer comprises 5 or more volume percent of glass, relative to the first conductive metal.

12. The method as set forth in claim 10, wherein:
    the second electrode layer comprises less than 3 volume percent of glass, relative to the second conductive metal.

13. The method as set forth in claim 10, wherein:
    the second electrode layer does not include glass.

14. The method as set forth in claim 10, wherein:
    the first conductive metal is at least one selected from the group consisting of copper (Cu), silver (Au), nickel (Ni), and alloys thereof.

15. The method as set forth in claim 10, wherein:
    the second conductive metal is copper (Cu).

16. The method as set forth in claim 15, wherein:
    the second electrode layer further includes silver (Au).

17. The method as set forth in claim 10, wherein:
    the second electrode layer is formed on the first electrode layer by transferring a sheet including the second conductive metal onto the first electrode layer.

18. The method as set forth in claim 10, wherein:
    the second electrode layer is disposed on an outer surface of the first electrode layer corresponding to each of both lengthwise end surfaces of the ceramic body.

19. A multilayer ceramic electronic component comprising:
    a ceramic body including a dielectric layer and a first internal electrode and a second internal electrode disposed in a stacking direction to face each other with the dielectric layer interposed therebetween; and a first external electrode electrically connected to the first internal electrode and a second external electrode electrically connected to the second internal electrode, the first and second external electrodes being disposed on the ceramic body and facing each other in a length direction of the ceramic body, wherein:

the first external electrode and the second external electrode each include a first electrode layer including a first conductive metal and glass, and a second electrode layer disposed on the first electrode layer and including a second conductive metal, and B is shorter than A, where a length of the first electrode layer in the length direction of the ceramic body is denoted by A and a length of the second electrode layer in the length direction of the ceramic body is denoted by B, the second conductive metal is copper (Cu), and the second electrode layer further comprises silver (Au).

* * * * *